United States Patent
Kudoh et al.

(10) Patent No.: US 6,731,669 B1
(45) Date of Patent: May 4, 2004

(54) ESTABLISHING METHOD OF SYNCHRONOUS COMMUNICATION BETWEEN STATION AND ACCESS POINT, STATION, LAN ADAPTER, AND FREQUENCY-HOPPED LAN RADIO SYSTEM

(75) Inventors: Hikaru Kudoh, Tokyo (JP); Tomoki Ohsawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/526,055

(22) Filed: Mar. 15, 2000

(30) Foreign Application Priority Data

Mar. 15, 1999 (JP) .......................................... 11-068568

(51) Int. Cl.[7] ............................................. H04B 1/713
(52) U.S. Cl. ..................................................... 375/133
(58) Field of Search .................................. 375/132, 133, 375/135, 136; 370/338, 329, 332

(56) References Cited

U.S. PATENT DOCUMENTS 5,815,811 A * 9/1998 Pinard et al. ................ 455/434

FOREIGN PATENT DOCUMENTS

| JP | 8-125582 | 5/1996 |
|---|---|---|
| JP | 9-215044 A | 8/1997 |

OTHER PUBLICATIONS

LAN Man Standards Committee of the IEEE Computer Society, "Information technology–Telecommunications and information exchange between systems–Local and metropolitan area–networks–Specific requirements, Part 11: Wireless LAN Medium Access Control (MAC) and Physical Layer (PHY) Specifications", ANS/IEEE Std. 802.11, 1999 Edition.

* cited by examiner

*Primary Examiner*—Stephen Chin
*Assistant Examiner*—Kevin Kim
(74) *Attorney, Agent, or Firm*—Sughrue Mion, PLLC

(57) ABSTRACT

The station selects a communication frequency of the station among the hopping frequencies, and then, receives, as reception frames, the frames, which are transmitted from the access points through the selected communication frequency. The station extracts the control frames from the reception frames, and monitors the extracted control frames during a monitoring time interval. After that, the station determines the selected access point, on the basis of the results of the monitoring. And also, the station synchronizes itself with the selected access point on the basis of information included in the extracted control frames, together with the dwell time assigned for the selected access point.

19 Claims, 7 Drawing Sheets

| Hopping Pattern | AP | Hopped Frequency Index | | | | |
|---|---|---|---|---|---|---|
| | | 1 | 2 | 3 | 4 | 5 |
| | 1 | CH1 | CH2 | CH3 | CH4 | CH5 |
| | 2 | CH2 | CH3 | CH1 | CH5 | CH4 |
| | 3 | CH4 | CH5 | CH2 | CH1 | CH3 |

FIG. 6

ESTABLISHING METHOD OF SYNCHRONOUS COMMUNICATION BETWEEN STATION AND ACCESS POINT, STATION, LAN ADAPTER, AND FREQUENCY-HOPPED LAN RADIO SYSTEM

BACKGROUND OF THE INVENTION

This invention relates to a frequency-hopped LAN radio system which comprises stations and access points (APs). For example, a station may comprise a notebook PC (personal computer) and a radio LAN adapter. More particularly, this invention relates to a method of establishing, on the station, synchronous communication with a suitable access point selected among the access points.

Wireless LAN technologies have rapidly grown in the art of computer networks. They provide user connectivity without being tethered by wired networks. One of the systems using the wireless LAN technologies is a LAN radio system in which radio frequencies are used for connection. Such LAN radio system employs a spread-spectrum modulation to enable multiple users to access to the network.

Frequency hopping (FH) is one form of the spread-spectrum modulation, in which a center frequency of a conventional carrier is altered many times a second in accordance with a pseudorandom or pseudonoise (PN) list of channels. Such list of the channels is referred to as a hopping pattern, in which the channels having the center frequencies to be altered are distinguished from each other by hopped frequency indexes corresponding thereto. The amount of time, for which a signal is present on any single channel, is called a dwell time.

A LAN radio system using the frequency hopping technology, called a frequency-hopped LAN radio system, comprises the access points working asynchronously for each other. Each of the access points has the hopping pattern and the dwell time determined for the hopping pattern, and covers a zone assigned for each access point to provide connection service. Roughly speaking, the access points transmit control frames that include information for synchronizing with the access points, while the station uses control frames to obtain the synchronization with one of the access points, in the frequency-hopped LAN radIo system. These are described, for example, in the IEEE Std 802.11-1997 "Wireless LAN Medium Access Control (MAC) and Physical Layer (PHY) specification", which is incorporated herein by reference.

To realize seamless communication during moving of the station between the zones, the frequency-hopped LAN radio system makes the zones of the access points overlap each other. In such system, the station needs to select one among the access points and to synchronize with the selected access point, when the station newly participates in the system or when the station transfers from one zone to another zone.

This shows that each station must select the access point and establish synchronization with the selected access point. However, it should be considered that the access points perform asynchronously to one another. As a result, it is difficult to select a desired one of the access points and to establish the synchronization with the desired access point, even if the control frames are used.

For example, the selection together with synchronization is disclosed in JP-A No. 8-125582. However, the disclosed selection method requires each of the stations to change the frequencies of control channel and data channel, in turn, and is too complex. Besides, the complex selection loses many periods of times and brings about inefficient communication.

Another selection known to the inventors is to start the selection and the synchronization at a time instant when the station receives first one of the control frames. This selection is simple to be realized, and however, the selected access point depends on the first received control frame. Therefore, the actually selected access point is not always the suitable one among the access points.

SUMMARY OF THE INVENTION

This invention therefore provides the method of establishing, on the station, synchronous communication with a suitable access point selected among the access points.

According to one aspect of the present invention, a following method of establishing, in a station, synchronous communication with an access point selected among a plurality of access points in a frequency-hopped radio LAN system is obtained. Herein, each of the access points is assigned with a hopping pattern of hopping frequencies and a dwell time determined for the hopping pattern. The access points transmit frames which include control frames.

In establishing method according to this aspect of the invention, the station selects a communication frequency of the station among the hopping frequencies. And then, the station receives, as reception frames, the frames which are transmitted from the access points through the selected communication frequency. The station extracts the control frames from the reception frames, and monitors the extracted control frames during a monitoring time interval. Herein, the monitoring time interval is predetermined in consideration of the dwell times assigned for the access points. After that, the station determines the selected access point and the hopping pattern assigned for the selected access point, on the basis of the results of the monitoring. And also, the station synchronizes itself with the selected access point on the basis of information included in the extracted control frames, together with the dwell time assigned for the selected access point.

More in detail, each of the hopping pattern has the hopping frequencies which are hopped at every dwell time corresponding to one of the access points and which are distinguished from each other by hopped frequency indexes, and the station may attain the synchronization as the followings.

The station decides a time instant at which the station will be synchronized with the selected access point, in consideration of ability of the station. And then, the station calculates the hopped frequency index corresponding to the decided time instant. The station uses the calculated hopped frequency index and the hopping pattern of the selected access point, to predict, as a predicted frequency, a usable one of the hopping frequencies that will be used for the selected access point at the decided time instant. The station obtains a remnant time from the decided time instant to an end time instant at which the dwell time of the predicted frequency will be finished. And thereby, the station adjusts the communication frequency of the station to the predicted frequency at the decided time instant, so as to communicate with the selected access point on the predicted frequency during the remnant time.

The above-mentioned method may be embodied in the form of a radio LAN adapter, which is adapted to be installed in the station and enables the station to the above operations.

BRIEF DESCRIPTION OF THE DRAWINGS

FIG. 6 is a table for use in describing a relation ship between channels (hopping frequencies), hopping patterns and hopped frequency indexes.

DESCRIPTION OF THE PREFERRED EMBODIMENTS

Figure 1:
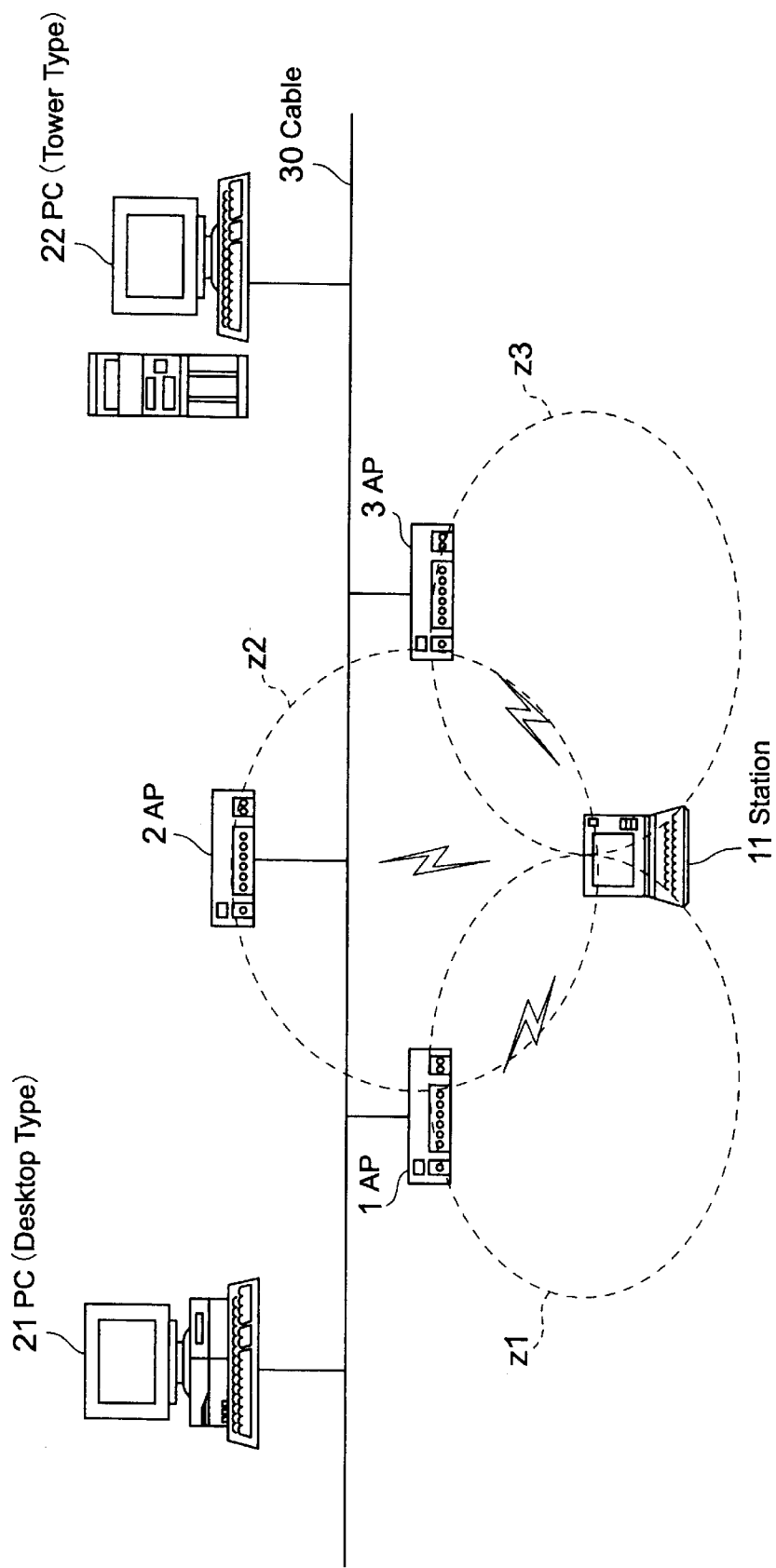
FIG. 1 schematically shows a frequency-hopped LAN radio system according to a preferred embodiment of this invention.

Referring to FIG. 1, a frequency-hopped LAN radio system according to a preferred embodiment of this invention comprises a wired-part and a wireless part. In illustrated wired-part, a PC (personal computer) of Desktop type 21, a PC of Tower type 22, and access points (APs) 1, 2, and 3 are connected to one another by a cable 30, such as an 10Base-t of Ethernet. In the illustrated wireless part, the access points 1 through 3 are assigned with zones z1 through z3, respectively. The zones z1 through z3 overlap each other.

The access point 1 provides connection service for a station entering the zone z1, and similarly do the access points 2 and 3. That is, the access points 1 through 3 bridge the wired-part and the stations belonging to the zones z1 through z3, respectively. Each of the access points 1 through 3 can accommodate a plurality of stations, such as mobile terminals, although the stations excepts for the station 11 are omitted in FIG. 1, for the sake of clarity.

The access points 1 through 3 work asynchronously for each other, and have hopping patterns and dwell times determined for the hopping patterns, respectively. In this embodiment, each of the access points determines the dwell time thereof, independently of the other access points. Each access point changes a communication frequency thereof, into one of hopping frequencies at every determined dwell time, in accordance with the hopping pattern of the access point. In addition, the hopping frequencies are distinguished from each other by hopped-frequency indexes, in each of the hopping patterns.

Figure 2:
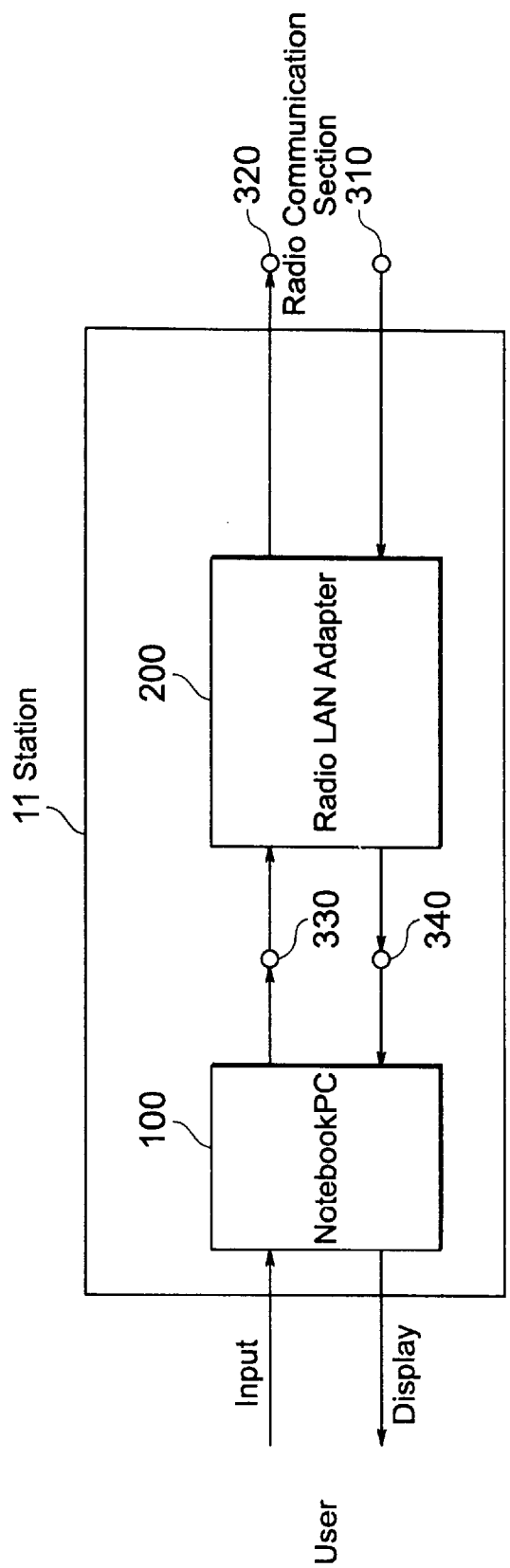
FIG. 2 schematically shows a station illustrated in FIG. 1.

Referring to FIG. 2, the illustrated station 11 comprises a notebook PC 100 and a radio LAN adapter (simply called LAN adapter, hereinafter) 200. The notebook PC 100 transmits data in the form of 'frame' through a connection point 330 to the LAN adapter 200. And then, the LAN adapter 200 transmits the frames, which are received from the notebook PC 100, through a terminal (or a transmitting antenna) 320 to the corresponding one of the access points 1 through 3.

The access point also transmits one frame or more frames at every dwell time, into the station. The LAN adapter receives the frames, which are transmitted from the corresponding access point, through another terminal (or a receiving antenna) 310, and then, transmits the received frames through another connection point 340 to the notebook PC 100. Herein, the received frames from the access point include control frames. The terminals 310 and 320 may be common to each other.

Figure 3:
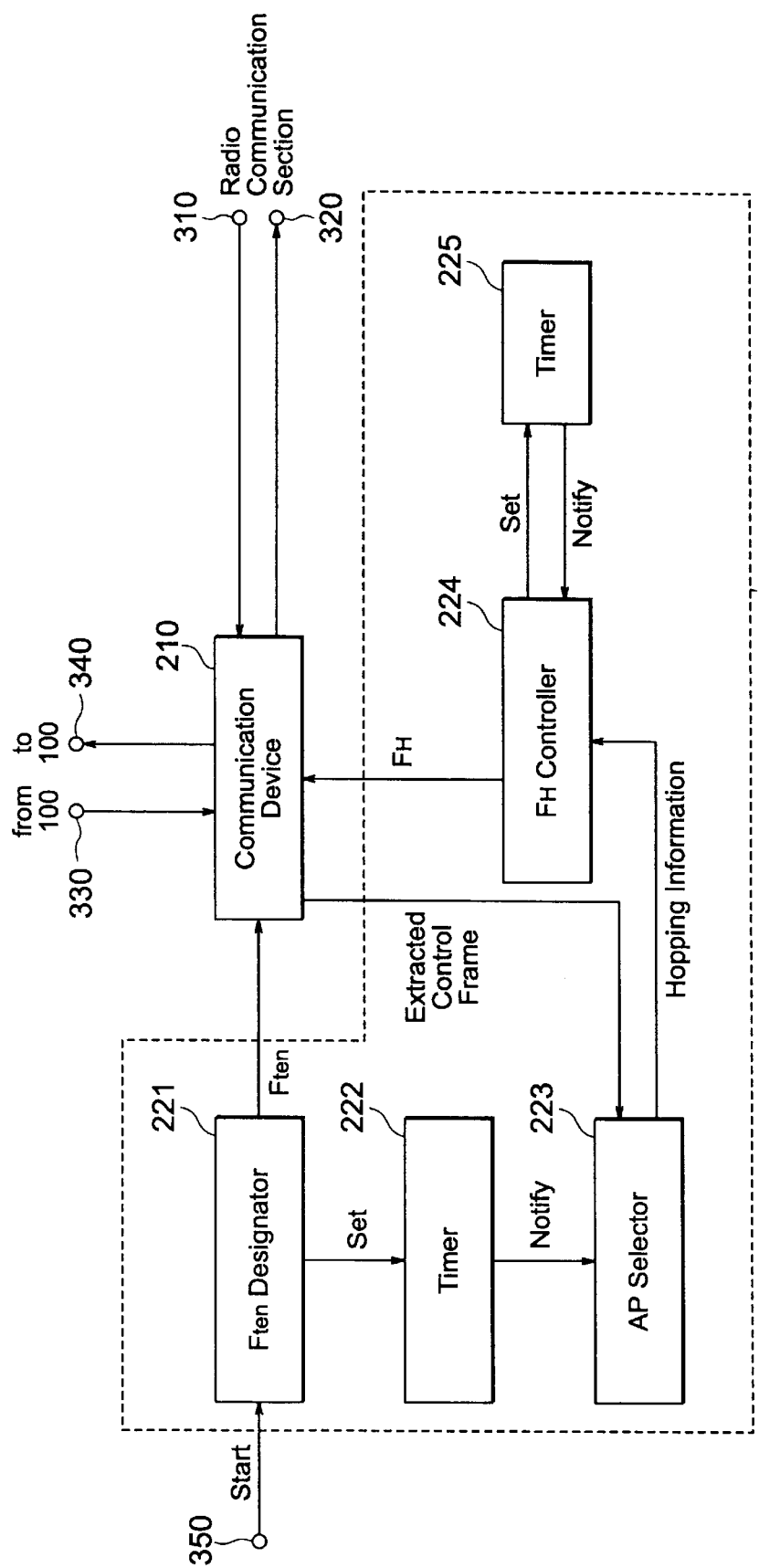
FIG. 3 schematically shows a radio LAN adapter illustrated in FIG. 2.

The illustrated LAN adapter 200 comprises a communication device 210 and a communication controller 220 coupled to the communication device 210, as shown in FIG. 3.

The communication device 210 is further coupled to the notebook PC 100 and the terminals 310 and 320. Such communication device 210 transmits the frames, which are received from the notebook PC 100, through the terminal 320 to the corresponding access point, on a communication frequency of the communication device 210. Also, the communication device 210 receives, through the terminal 310, the frames transmitted on the communication frequency from the corresponding access point, and then, transmits the frames to the notebook PC 100.

The communication frequency of the communication device 210 is changeable under the control of the communication controller 220. Such communication device 210 may comprise a modem and a radio communicator.

The illustrated communication controller 220 comprises a tentative frequency designator ($F_{ten}$ designator) 221, timers 222 and 225, an access point selector (AP selector) 223, and a frequency hopping controller ($F_H$ controller) 224.

Figure 4:
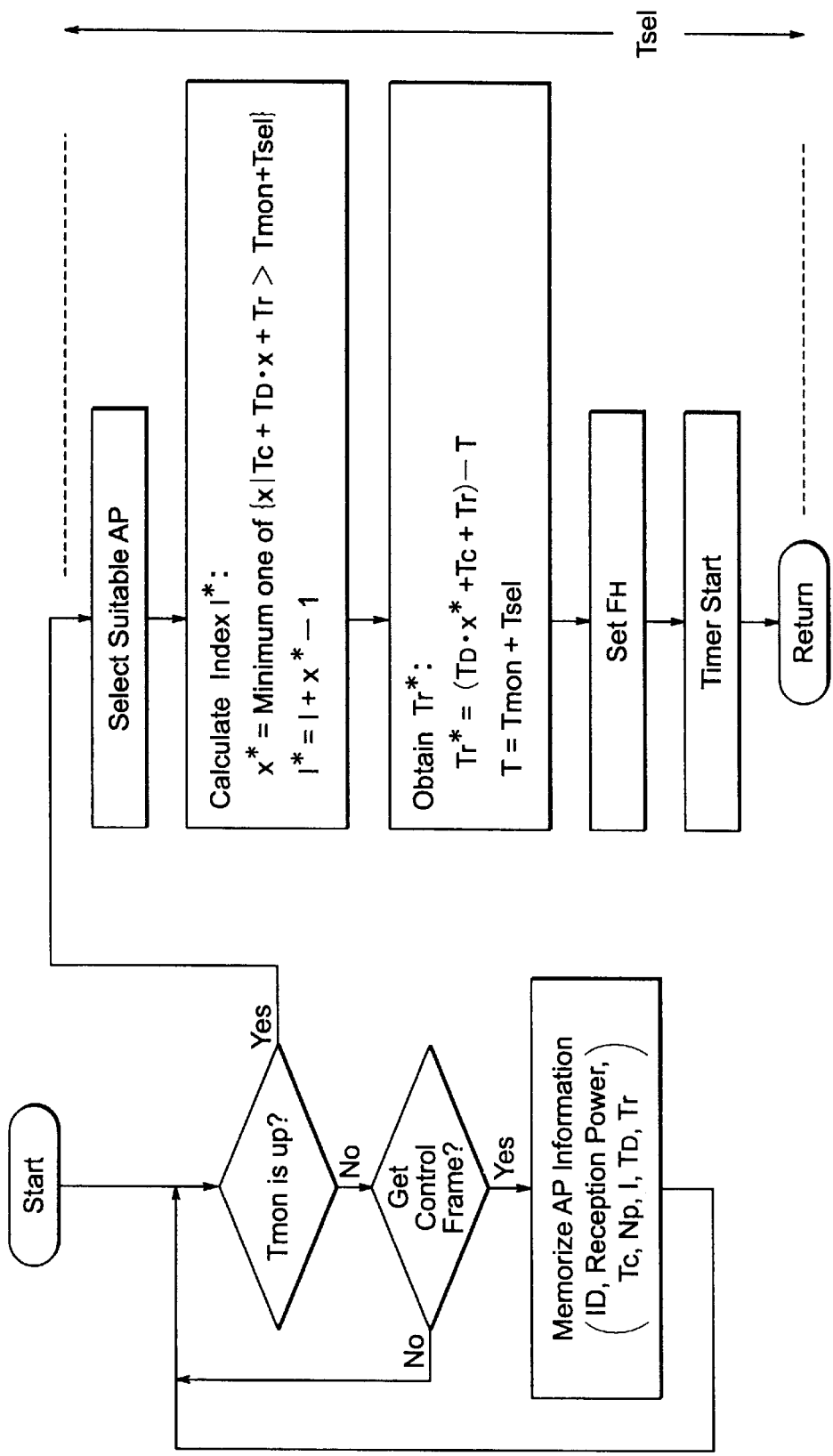
FIG. 4 a flow-chart for use in describing operations of a communication controller illustrated in FIG. 3.

As the station 11 starts an operation of the communication, the tentative frequency designator 221 receives a signal indicative of the starting, through the terminal 350. And then, the tentative frequency designator 221 designates, as a tentative frequency, one selected among the hopping frequencies, as shown in FIG. 4. The tentative frequency may be selected at a time of the designating, or may be selected before the designating. In addition, the selection may be voluntarily executed at a side of the tentative frequency designator 221 with no restriction and condition, in this embodiment.

When the tentative frequency designator 221 designates the tentative frequency as the communication frequency for the communication device 210, the communication device 210 receives, as reception frames, the frames which are transmitted on the tentative frequency, and extracts the control frames from the reception frames. That is, the communication frequency of the communication device 210 is subjected to the control of the tentative frequency designator 221, till the establishment of the synchronization. The extracted control frames are transmitted to the access point selector 223.

Figure 5:
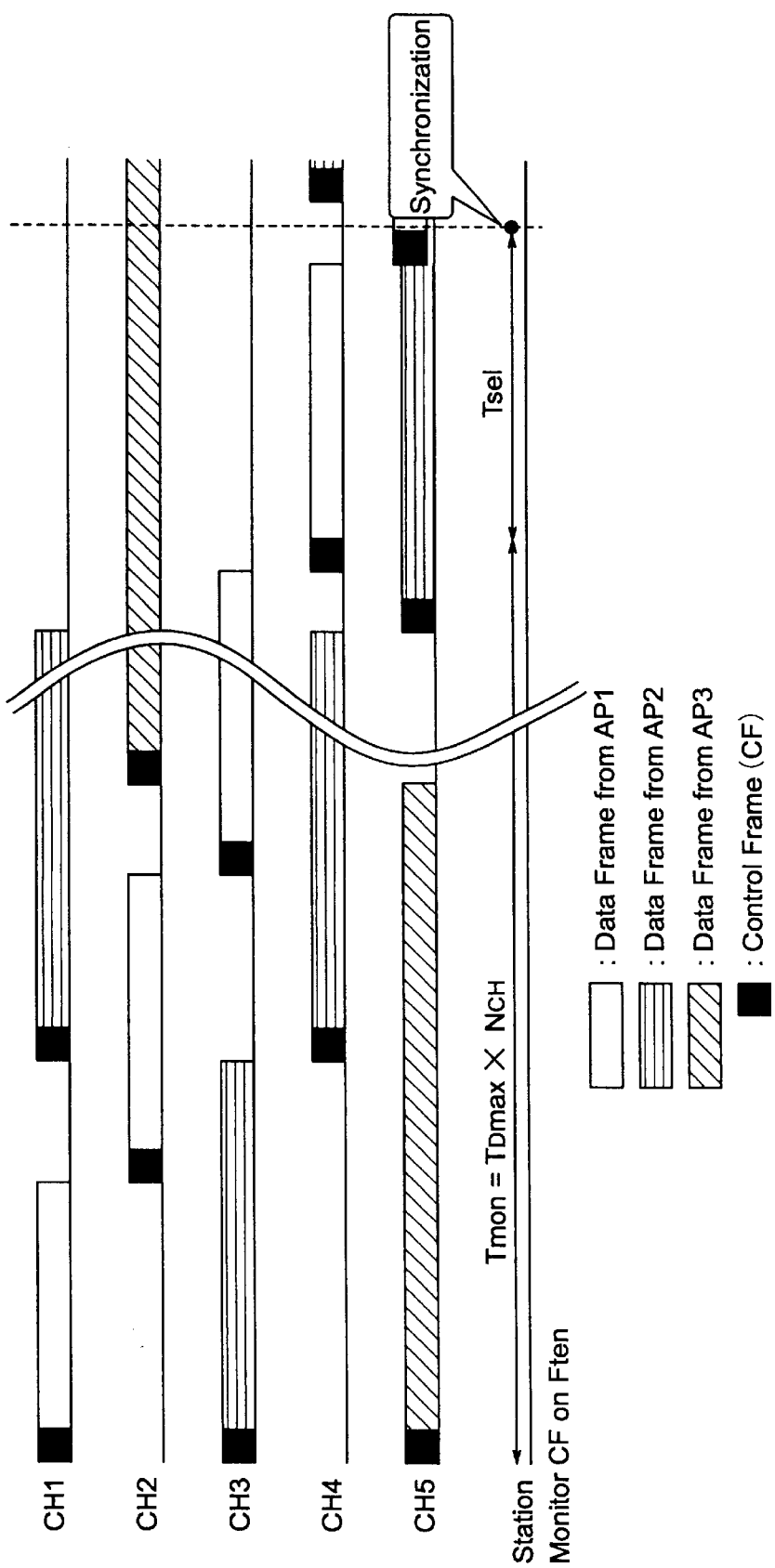
FIG. 5 is a time-chart for use in describing a monitoring time interval.

Simultaneously, the tentative frequency designator 221 sets the timer 222 for a monitoring time interval $T_{mon}$. The monitoring time interval $T_{mon}$ is decided in consideration of the dwell times of the access points 1 through 3. Specifically, the monitoring time interval $T_{mon}$ may consider the maximum one of the dwell times assigned for the access points 1 through 3, because the access points 1 through 3 work asynchronously for each other, as illustrated in FIG. 5. In this embodiment, the monitoring time interval $T_{mon}$ is obtained by multiplying the maximum dwell time $T_{Dmax}$ by the number $N_{CH}$ of the hopped frequency indexes included in a single hopping pattern. Herein, the number $N_{CH}$ of the hopped frequency indexes in a single hopping pattern is equal to one of the channels.

When the monitoring time interval is up, the timer 222 notifies the access point selector 223 of timeup of the monitoring time interval. The timer 222 may comprise a counter. In addition, the timer 222 may see how long it takes for the communication device 210 to first receive the control frame. Such time interval, which is from the starting time instant $T_S$ of the communicating to the first receiving time instant $T_R$, will be referred to as a control frame reception time $T_C$.

The access point selector 223 monitors the control frames extracted by the communication device 210. The access point selector 223 obtains the extracted control frame to memorize an access point information included in the extracted control frame.

For example, the access point information comprises identification (ID) of the access point, the number of the stations accommodated in the access point, and the number $N_P$ of the hopping pattern of the access point, as shown in FIG. 4. The access point information further may comprise the hopped frequency index I corresponding to the extracted control frame and the dwell time $T_D$ of the access point. The identification ID, the number of the station, the number $N_P$, the index I, the dwell time $T_D$ are obtained from the extracted control frame itself. In addition, the access point selector may memorize, in the access point information, reception power of the extracted control frame, a remnant time $T_r$ from the receiving time instant to an end time instant of the dwell time corresponding to the extracted control frame, and the control frame reception time $T_C$. The reception power, the remnant time $T_r$, and the control frame reception time $T_C$ are obtained by utilizing the extracted control frame.

The memorization is repeatedly executed during the monitoring time interval, as shown in FIG. 4. The access point selector 223 may memorize the number of the extracted control frames.

When receiving the notification of the timer 222, the access point selector 223 stops the monitoring, and then, selects suitable access point among the access points, on the basis of the access point information memorized during the monitoring time interval.

For example, the selection is executed in consideration of the reception power, the number of the extracted control frames, the number of the accommodated stations and/or the dwell time.

In this embodiment, the access point selector 223 selects, as the selected access point, an access point which transmits the extracted control frames having maximum reception power among the extracted control frames of all access point.

The access point selector 223 may select, by counting the number of the extracted control frames for every access point, and by detecting, as the selected access point, an access point which has the maximum number of the extracted control frames among all access points.

Also, the access point selector 223 may select, as the selected access point, an access point which has the minimum number of the stations accommodated therein, among all access points.

In addition, the access point selector 223 may select, as the selected access point, an access point assigned with the dwell time which is appropriate to the station, in comparison with the dwell times of the other access points.

After the selecting, the access point selector 223 outputs hopping information into the frequency hopping controller 224, as shown in FIG. 3. The hopping information is used for synchronizing with the selected access point, and includes the hopping pattern, the hopped frequency indexes, and the dwell time of the selected access point.

The frequency hopping controller 224 is adapted to control the communication device 210, so that the communication frequency is hopped at every dwell time of the selected access point, in accordance with the hopping pattern of the selected access point. In detail, the frequency hopping controller 224 makes the communication device 210 communicate with the selected access point in synchronization, as the followings, and then, executes the normal control of the frequency hopping.

When receiving the hopping information from the access point selector 223, the frequency hopping controller 224 decides a time instant at which the station 11 will be synchronized with the selected access point. The decided time instant $T_d$ depends on a selection time interval $T_{sel}$ that is predetermined in consideration of the ability of the frequency hopping controller 224.

And then, the frequency hopping controller 224 calculates the hopped frequency index I corresponding to the decided time instant $T_d$, that will especially referred to as the hopped frequency index I*, or simply, as the index I*. In this embodiment, the frequency hopping controller 224 considers the following inequality:

$$T_C + T_D \cdot X + T_r > T_{mon} + T_{sel}$$

And then, the frequency hopping controller 224 picks up, as a particular coefficient x*, the minimum one among coefficients "x" of the dwell time $T_D$ which met the foregoing inequality.

The frequency hopping controller 224 calculates the following equation:

$$I^* = I + x^* - 1$$

and thereby, obtains the hopped frequency index I*.

After the calculation, the frequency hopping controller 224 predicts, as a predicted frequency, a usable one of the hopping frequencies that will be used for the selected access point at the decided time instant $T_d$. In detail, the frequency hopping controller 224 identifies the predicted frequency by using the calculated hopped frequency Index I* and the hopping pattern of the selected access point.

For example, the relationship between channels (hopping frequencies), shown as hopping patterns and hopped frequency indexes is given in FIG. 6. In the example, the number of the channels is five. Besides, it is assumed that the selected access point is the access point 1 and the calculated hopped frequency index I* is No. 3. In this assumption, the predicted frequency is the hopping frequency corresponding to the channel No. 3. Also, it is assumed that the selected access point is the access point 2 and the calculated hopped frequency index I* is No. 4. In the assumption, the predicted frequency is the hopping frequency of the channel No. 5.

Figure 7:
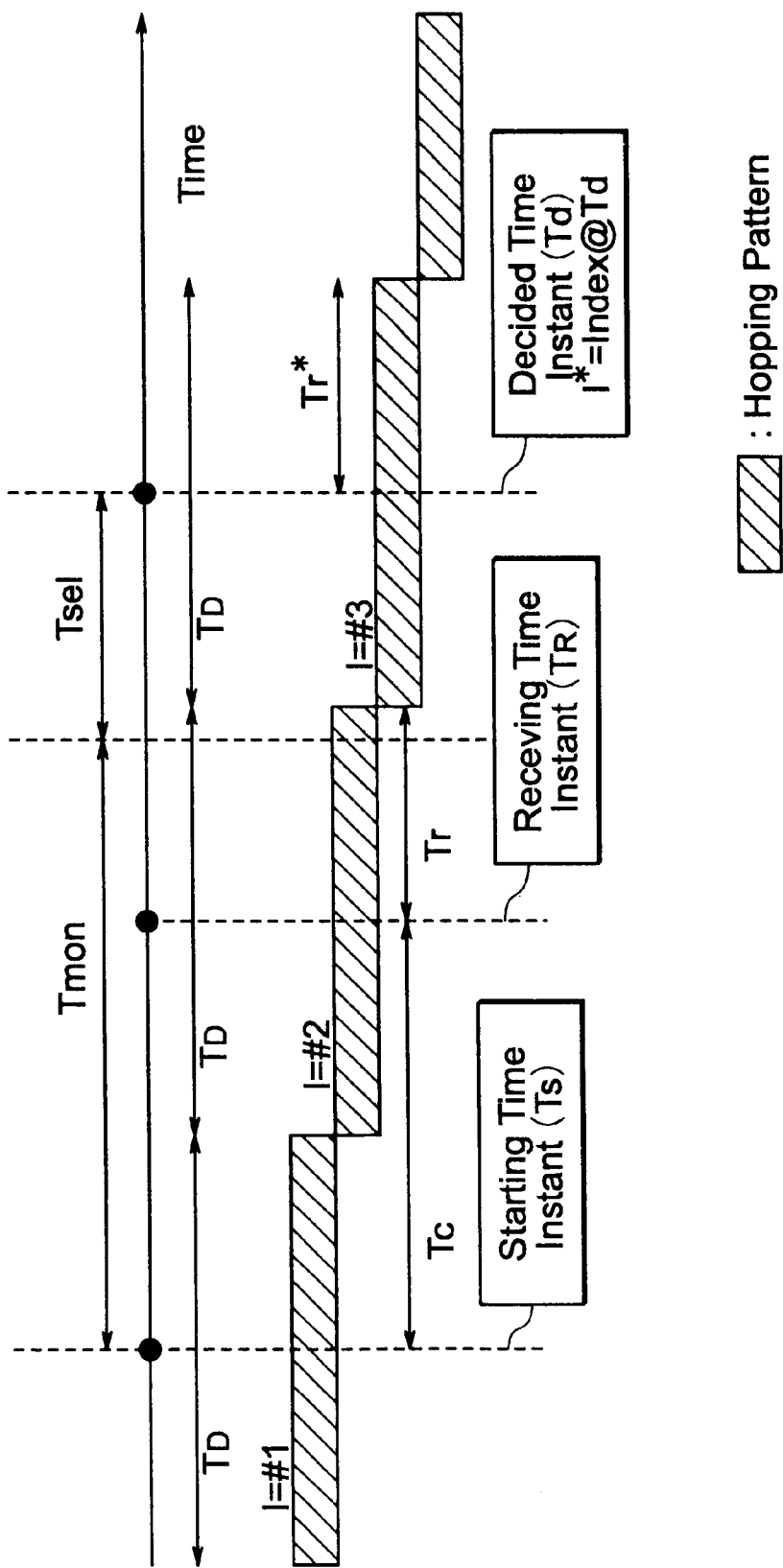
FIG. 7 a time-chart for use in describing an index I* and a remnant time $T_r^*$.

On the other hand, the frequency hopping controller 224 obtains a remnant time $T_r^*$ from the decided time instant $T_d$ to an end time instant at which the dwell time $T_D$ of the predicted frequency will be finished, as shown in FIG. 7. In this embodiment, to obtain the remnant time $T_r^*$, the frequency hopping controller 224 calculates the following equation:

$$T_r^* = (T_d \cdot x^* + T_C + T_r) - (T_{mon} + T_{sel})$$

The frequency hopping controller 224 controls the communication device 210, so that the communication frequency becomes the predicted frequency at the decided time instant $T_d$. Simultaneously, the frequency hopping controller 224 sets the timer 225 for the remnant time $T_r^*$ at the decided time instant $T_d$, and thereby, the synchronization will be accomplished.

After the accomplishment of the synchronization, the frequency hopping controller 224 executes the normal control of the frequency hopping, in cooperation with the timer

225. In detail, when the remnant time $T_r^*$ is up, the timer 225 notifies the frequency hopping controller 224 of a time-up of the remnant time $T_r^*$. Responsive to the notification, the frequency hopping controller 224 increases the hopped frequency index I by one. Simultaneously, the frequency hopping controller 224 controls the communication device in correspondence with the increased hopped index I, so that the communication frequency is a succeeding one of the hopping frequencies, in accordance with the hopping pattern of the selected access point. And the frequency hopping controller 224 sets the timer 225 for the dwell time of the selected access point. When the dwell time $T_D$ is up, the timer 225 notifies the frequency hopping controller 224 of the time-up of the dwell time $T_D$.

In addition, the frequency hopping controller 224 further controls the communication device 210, so that the communication frequency is hopped at every dwell time $T_D$ of the selected access point, in accordance with the hopping pattern of the selected access point. The frequency hopping controller 224 further sets the timer 225 for the dwell time $T_D$ of the selected access point at every time when the communication frequency of the communication device 210 is hopped. On the other hand, the timer 225 notifies the frequency hopping controller 224 of the time-up at every time-up of the dwell time $T_D$.

What is claimed is:

1. A method of establishing in a station synchronous communication with an access point selected among a plurality of access points in a frequency-hopped radio LAN system, each of the access points being assigned a hopping pattern of hopping frequencies and a dwell time determined for the hopping pattern, the access points transmitting frames which include control frames, said method comprising:

selecting a communication frequency of the station among the hopping frequencies;

receiving, as reception frames, the frames which are transmitted from the access points through the selected communication frequency;

extracting control frames from the reception frames;

monitoring the extracted control frames during a monitoring time interval which is predetermined in consideration of the dwell times assigned for the access points;

determining the selected access point and the hopping pattern assigned for the selected access point, on the basis of the results of the monitoring; and synchronizing the station with the selected access point on the basis of information included in the extracted control frames, together with the dwell time assigned for the selected access point, wherein:

each of the hopping patterns corresponds to one of the access points and has the hopping frequencies which are hopped at every dwell time, the hopping frequencies being distinguished form each other by hopped frequency indexes; and the synchronizing comprises:

deciding a time instant at which the station will be synchronized with the selected access point, in consideration of ability of the station;

calculating the hopped frequency index corresponding to the decided time instant;

predicting, as a predicted frequency, a usable one of the hopping frequencies that will be used for the selected access point at the decided time instant, by using the calculated hopped frequency index and the hopping pattern of the selected access point;

obtaining a remnant time from the decided time instant to an end time instant at which the dwell time of the predicted frequency will be finished; and adjusting a communication frequency of the station to the predicted frequency at the decided time instant, so as to communicate with the selected access point on the predicted frequency during remnant time.

2. The establishing method as claimed in claim 1, wherein the monitoring time interval is obtained by multiplying a maximum one of the dwell times assigned for the access points by the number of the hopped frequency indexes included in a single hopping pattern.

3. The establishing method as claimed in claim 1, wherein the determining is carried out, so that the selected access point transmits the extracted control frames having maximum reception power among the extracted control frames of all access points.

4. A method of establishing in a station synchronous communication with an access point selected among a plurality of access points in a frequency-hopped radio LAN system, each of the access points being assigned a hopping pattern of hopping frequencies and a dwell time determined for the hopping pattern, the access points transmitting frames which include control frames, said method comprising:

selecting a communication frequency of the station among the hopping frequencies;

receiving, as reception frames, the frames which are transmitted from the access points through the selected communication frequency;

extracting control frames from the reception frames;

monitoring the extracted control frames during a monitoring time interval which is predetermined in consideration of the dwell times assigned for the access points;

determining the selected access point and the hopping pattern assigned for the selected access point, on the basis of the results of the monitoring; and synchronizing the station with the selected access point on the basis of information included in the extracted control frames, together with the dwell time assigned for the selected access point, wherein:

the monitoring comprises counting the number of the extracted control frames for every access point; and the determining comprising detecting, as the selected access point, an access point which has the maximum number of the extracted control frames among all access points.

5. The establishing method as claimed in claim 1, wherein the frequency-hopped radio LAN system further comprises other stations, the determining being carried out, so that the selected access point has the minimum number of the stations accommodated therein, among all access points.

6. The establishing method as claimed in claim 1, the determining being executed, so that the dwell time of the selected access point is appropriate to the station, in comparison with the dwell times of the other access points.

7. A LAN adapter configured to be installed in a station used in a frequency-hopped radio LAN system which comprises a plurality of access points working asynchronously from each other, each of the access points being assigned with a hopping pattern of hopping frequencies and a dwell time determined for the hopping pattern, the access points transmitting frames which include control frames, said LAN adapter comprising:

a communication device adapted to communicate with the access points on a communication frequency of the communication device, to extract control frames from frames transmitted from the access points through the communication frequency, the communication frequency being changeable;

a tentative frequency designator adapted to designate as the communication frequency a tentative frequency selected among the hopping frequencies, so that the communication device receives frames transmitted from the access points through the tentative frequency to extract the control frames from the received frames;

an access point selector adapted to select an access point among the access points by monitoring the control frames extracted during a monitoring time interval which is predetermined in consideration of the dwell times of the access points; and a frequency hopping controller, coupled to the access point selector and the communication device, adapted to control the communication device on the basis of information included in the extracted control frame, together with the dwell time assigned for the selected access point, so that the communication frequency becomes one of the hopping frequencies that is used for the selected access point in synchronization with the selected access point, wherein the frequency hopping controller decides a time instant at which the station will be synchronized with the selected access point, in consideration of ability of the frequency hopping controller, and then, predicts, as a predicted frequency, a usable one of the hopping frequencies that will be used for the selected access point at the decided time instant.

8. The LAN adapter as claimed in claim 7, wherein:

each of the hopping patterns has the hopping frequencies which are hopped at every dwell time corresponding to one of the access points and which are distinguished from each other by hopped frequency indexes;

the frequency hopping controller calculating the hopped frequency index corresponding to the decided time instant so as to predict the predicted frequency, by using the calculated hopped frequency index and the hopping pattern of the selected access point.

9. The LAN adapter as claimed in claim 8, said LAN adapter further comprising a timer coupled to the frequency hopping controller, wherein the frequency hopping controller obtains a remnant time from the decided time instant to an end time instant at which the dwell time of the predicted frequency will be finished, so as to set the timer for the remnant time at the decided time instant.

10. The LAN adapter as claimed in claim 9, wherein:

the timer notifies the frequency hopping controller of a time-up of the remnant time, when the remnant time is up; and the frequency hopping controller further controls the communication device, after the time-up of the remnant time is notified, so that the communication frequency is hopped at every dwell time of the selected access point in accordance with the hopping pattern of the selected access point.

11. The LAN adapter as claimed in claim 10, wherein:

the frequency hopping controller further sets the timer for the dwell time of the selected access point at every time when the communication frequency of the communication device is hopped; and the timer notifies the frequency hopping controller of a time-up at every time-up of the dwell time, the notification being utilized in controlling in the frequency hopping controller.

12. A LAN adapter configured to be installed in a station used in a frequency-hopped radio LAN system which comprises a plurality of access points working asynchronously from each other, each of the access points being assigned with a hopping pattern of hopping frequencies and a dwell time determined for the hopping pattern, the access points transmitting frames which include control frames, said LAN adapter comprising:

a communication device adapted to communicate with the access points on a communication frequency of the communication device, to extract control frames from frames transmitted from the access points through the communication frequency, the communication frequency being changeable;

a tentative frequency designator adapted to designate as the communication frequency a tentative frequency selected among the hopping frequencies, so that the communication device receives frames transmitted from the access points through the tentative frequency to extract the control frames from the received frames;

an access point selector adapted to select an access point among the access points by monitoring the control frames extracted during a monitoring time interval which is predetermined in consideration of the dwell times of the access points; and a frequency hopping controller, coupled to the access point selector and the communication device, adapted to control the communication device on the basis of information included in the extracted control frame, together with the dwell time assigned for the selected access point, so that the communication frequency becomes one of the hopping frequencies that is used for the selected access point in synchronization with the selected access point, said LAN adapter further comprising a timer coupled to the tentative frequency designator and the access point selector, wherein:

the tentative frequency designator is further adapted to set the timer for the monitoring time interval; and the timer being adapted to notify the access point selector of time-up of the monitoring time interval.

13. The LAN adapter as claimed in claim 12, wherein the monitoring time interval is obtained by multiplying a maximum one of the dwell times assigned for the access points by the number of the hopped frequency indexes included in a single hopping pattern.

14. The LAN adapter as claimed in claim 7, wherein the access point selector selects as the selected access point, an access point which transmits the extracted control frames having maximum reception power among the extracted control frames of all access points.

15. A LAN adapter configured to be installed in a station used in a frequency-hopped radio LAN system which comprises a plurality of access points working asynchronously from each other, each of the access points being assigned with a hopping pattern of hopping frequencies and a dwell time determined for the hopping pattern, the access points transmitting frames which include control frames, said LAN adapter comprising:

a communication device adapted to communicate with the access points on a communication frequency of the communication device, to extract control frames from frames transmitted from the access points through the communication frequency, the communication frequency being changeable; and a tentative frequency designator adapted to designate as the communication frequency a tentative frequency selected among the hopping frequencies, so that the communication device receives frames transmitted from the access points through the tentative frequency to extract the control frames from the received frames;

an access point selector adapted to select an access point among the access points by monitoring the control frames extracted during a monitoring time interval which is predetermined in consideration of the dwell times of the access points; and a frequency hopping controller, coupled to the access point selector and the communication device, adapted to control the communication device on the basis of information included in the extracted control frame, together with the dwell time assigned for the selected access point, so that the communication frequency becomes one of the hopping frequencies that is used for the selected access point in synchronization with the selected access point, wherein the access point selector counts the number of the extracted control frames for every access point and detects as the selected access point an access point which has the maximum number of the extracted control frames among all access points.

16. The LAN adapter as claimed in claim 7, wherein:

the frequency-hopped radio LAN system further comprises other stations; and the access point selector selects as the selected access point an access point which has the minimum number of the stations accommodated therein among all access points.

17. The LAN adapter as claimed in claim 7, wherein the access point selector selects as the selected access point an access point assigned with the dwell time which is appropriate to the station, in comparison with the dwell times of the other access points.

18. The station adapted to be used in a frequency-hopped radio LAN system, the station comprising a LAN adapter as claimed in claim 7.

19. The frequency-hopped radio LAN system comprising a station as claimed in claim 18.

* * * * *